United States Patent [19]

Persohn et al.

[11] Patent Number: 4,798,239

[45] Date of Patent: Jan. 17, 1989

[54] DEVICE FOR THE PROTECTION AGAINST FREEZING OF INSTALLATIONS FOR THE STORAGE OR THE SUPPLY OF A FREEZING LIQUID, IN PARTICULAR WATER

[76] Inventors: Paul H. Persohn; Philippe Persohn, both of Le Rey, 33430 Bazas, France

[21] Appl. No.: 568,961

[22] Filed: Jan. 6, 1984

[30] Foreign Application Priority Data

Jan. 6, 1983 [FR] France ................... 83 00245
Aug. 26, 1983 [FR] France ................... 83 13744

[51] Int. Cl.⁴ .................... F24J 3/08; E03B 7/12; F28D 15/00
[52] U.S. Cl. ................... 165/45; 165/47; 165/104.21; 137/301; 137/334; 137/340; 138/32
[58] Field of Search ............ 165/45, 47; 137/59, 137/334, 340, 301; 126/415; 138/32, 34

[56] References Cited

U.S. PATENT DOCUMENTS

| | | |
|---|---|---|
| 1,151,132 | 8/1915 | Stary ................... 165/45 |
| 2,761,286 | 9/1956 | Billue et al. ........... 165/45 |
| 2,937,009 | 5/1960 | Anderson .............. 165/45 |
| 4,069,409 | 1/1978 | Noland et al. ......... 137/301 |
| 4,269,539 | 5/1981 | Hopke . |
| 4,320,720 | 3/1982 | Streed ................. 165/104.21 |
| 4,448,241 | 5/1984 | Andres ................. 165/104.21 |

Primary Examiner—Albert W. Davis, Jr.
Attorney, Agent, or Firm—Robert J. Koch

[57] ABSTRACT

A device for protecting installations for the storage or supply of a freezing liquid, in particular water, against freezing, comprising at least one heat tube or heat pipe having one end placed in the ground at a distance from the surface sufficient so that the temperature at this location is always above 0° C., the end being equipped on the outside with a fin type heat recovery system or the like, and on the inside with a system for the distribution of the condensate drip, while the other end of the heat pipe is laid out and arranged so that it is located in the immediate vicinity of the part of the installation exposed to the risk of freezing, and the application of the device to installations for the storage and distribution of water.

3 Claims, 8 Drawing Sheets

DEVICE FOR THE PROTECTION AGAINST FREEZING OF INSTALLATIONS FOR THE STORAGE OR THE SUPPLY OF A FREEZING LIQUID, IN PARTICULAR WATER

BACKGROUND OF THE INVENTION

1. Field of the Invention

The present invention relates to the protection against freezing of installations for the storage or supply of a liquid susceptible to freezing. Water is particularly of interest. Any volume of the liquid, small or large, is protected by the present invention whether such liquid is permanently present or not and whether the liquid is insufficiently buried to protect it against freezing.

2. Background of the Art

The invention thus is applicable, as will be seen below in the description, to water taps, meters, valves, pumps, drinking water reservoirs for animals, etc.

Traditionally, protection against freezing is effected by a supply of heat of electrical origin, or the draining of the volumes exposed, or by thermal insulation. In the last two cases the use of the appliances protected is slowed by additional manipulations, which at times are complicated and restricting.

Protection by draining involves subsequently another draining. Protection by thermal insulation requires the stripping of certain parts to gain access. In the aboveground type of water taps, the ratio between the thermal inertia of the material employed and the grade of the insulation permits only a presumption of the protection obtained. This explains the fact that long periods of freezing overcome this type of protection. The limits of this type of protection recede with the use of semi-buried or buried materials.

It is the object of the present invention to eliminate these problems, while permitting immediate use regardless of the climatic conditions.

DESCRIPTION OF THE INVENTION

The principle of the invention is to use heat pipes, also called heat transfer ducts, to tap the underground heat which is always available and to transfer it to the exposed parts. The operation of these ducts is spontaneous and causes the transfer of heat to all surface elements colder than the pipe. The quantity of the heat transported is proportional to the difference in temperature.

For this purpose, an object of the invention is a device for the protection against freezing of installations for the storage and supply of a freezing liquid, in particular water, characterized in that it includes at least one heat pipe or heat transfer duct comprising an end placed in the ground at a sufficient distance from the surface that the temperature at this location is always higher than 0° C., end is equipped optionally on the outside with a fin type heat collection system or the like, and on the inside with a condensate drip distribution system. The other end of the heat pipe is laid out and arranged so that it is located in the immediate vicinity of the part of the installation exposed to the danger of freezing.

BRIEF DESCRIPTION OF THE DRAWINGS

Further characteristics and advantages of the invention will become apparent from the description below of different applications, the description being given as an example only, and with reference to the drawing attached hereto, wherein.

DESCRIPTION OF THE PREFERRED EMBODIMENTS

Figure 1:
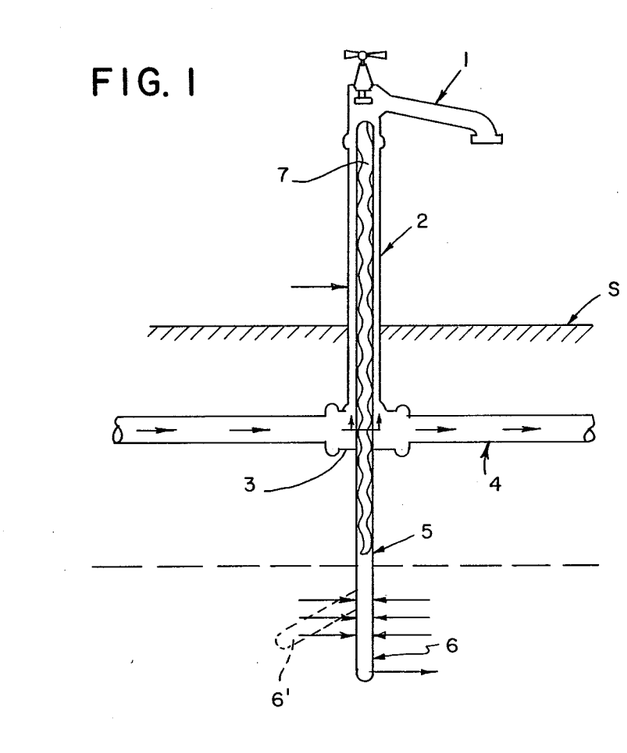
FIG. 1 is a schematic view showing a device according to the invention for the protection of an aboveground water tap.

FIG. 1 illustrates the principle of the invention applied to an aboveground water tap 1, mounted on the end of a riser pipe 2, itself connected by means of a Tee connection 3 with a pipe 4 buried at a distance of several tens of centimeters under the surface of the soil S, in the conventional manner.

According to the invention, a heat pipe 5 is placed so that its lower part 6 is buried at an appreciably lower level than that of the pipe 4, in a manner so that at this location the temperature will under all conditions be above 0° C., regardless of the atmospheric temperature aboveground. This distance is of the order of several tens of centimeters (1 m to 1.2 m, for example), under the pipe 4.

If the nature of the soil does not permit digging deep enough, the end 6 should be inclined more or less as shown by the broken line at 6'.

The heat tube 5 passes through the connection 3 in a tight manner, in the axis of the riser pipe 2, and extends inside the latter so that its upper end 2 is next to the closing element of the tap 1.

The heat transfer duct or heat pipe consists for example of an annealed copper tube with an inside diameter of 1 cm, containing a fluorocarbon fluid with a high vapor pressure, in an appropriate amount. Advantageously, a coil of a steel wire is applied to the internal wall, at least along the lower part 6, which is to be buried, in order to wet the entire inner surface and to facilitate the distribution of the condensate drip.

Such a configuration of a heat pipe is well known and does not require description in detail.

In operation, the lower part 6 of the heat pipe is filled with a condensable fluid which absorbs heat from the surrounding soil. The condensable fluid evaporates and rises to the upper part of the heat pipe, where, in thermal contact with the water of the riser pipe 2, it releases heat to said water, thereby heating it. As the result of this transfer of heat, the gas condenses on the wall of the heat pipe and drips to the lower part, where it again recovers heat and so on.

There is thus a transfer of heat from the soil to the riser pipe 2 and the tap 1, sufficient to prevent the freezing of the water in the pipe 2.

Figure 2:
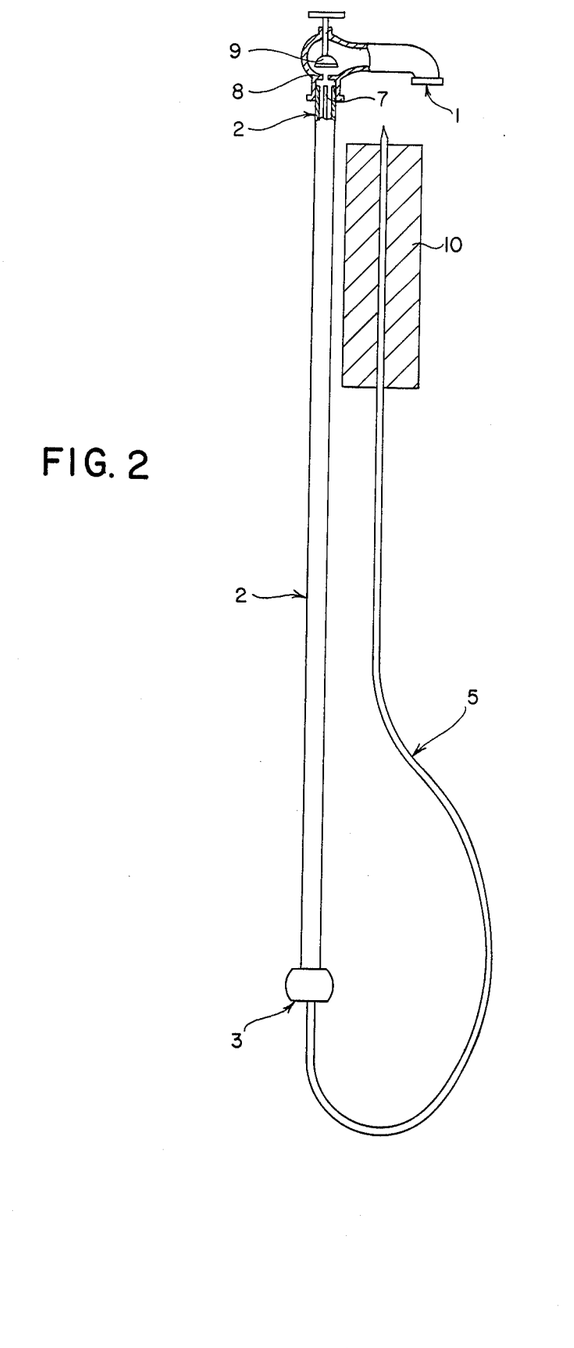
FIG. 2 is a plan view of one embodiment according to FIG. 1.

FIG. 2 shows a further embodiment of the device of FIG. 1. The riser pipe 2 has an inner diameter sufficient to receive the heat pipe 5 without interfering with the flow of water desired. The upper end 7 of the heat pipe is fastened by any appropriate means in the axis of the seat 8 of the tap and in the immediate vicinity of the plane of the seat 8, with respect to the valve (or any other closing element of the tap). Tightness between the connection 3 and the pipe 5 is obtained for example by welding or crimping.

The lower end of the heat pipe 5 is preferably equipped with at least one heat recovery fin 10, which may be solid or hollow and is in communication with the internal space of the heat pipe, attached to the pipe by any appropriate means and intended to improve the underground exchange of heat. The heat pipe 5 is shown doubled back on itself for illustration only, and would be installed in the ground as shown in FIG. 1.

Figure 3:
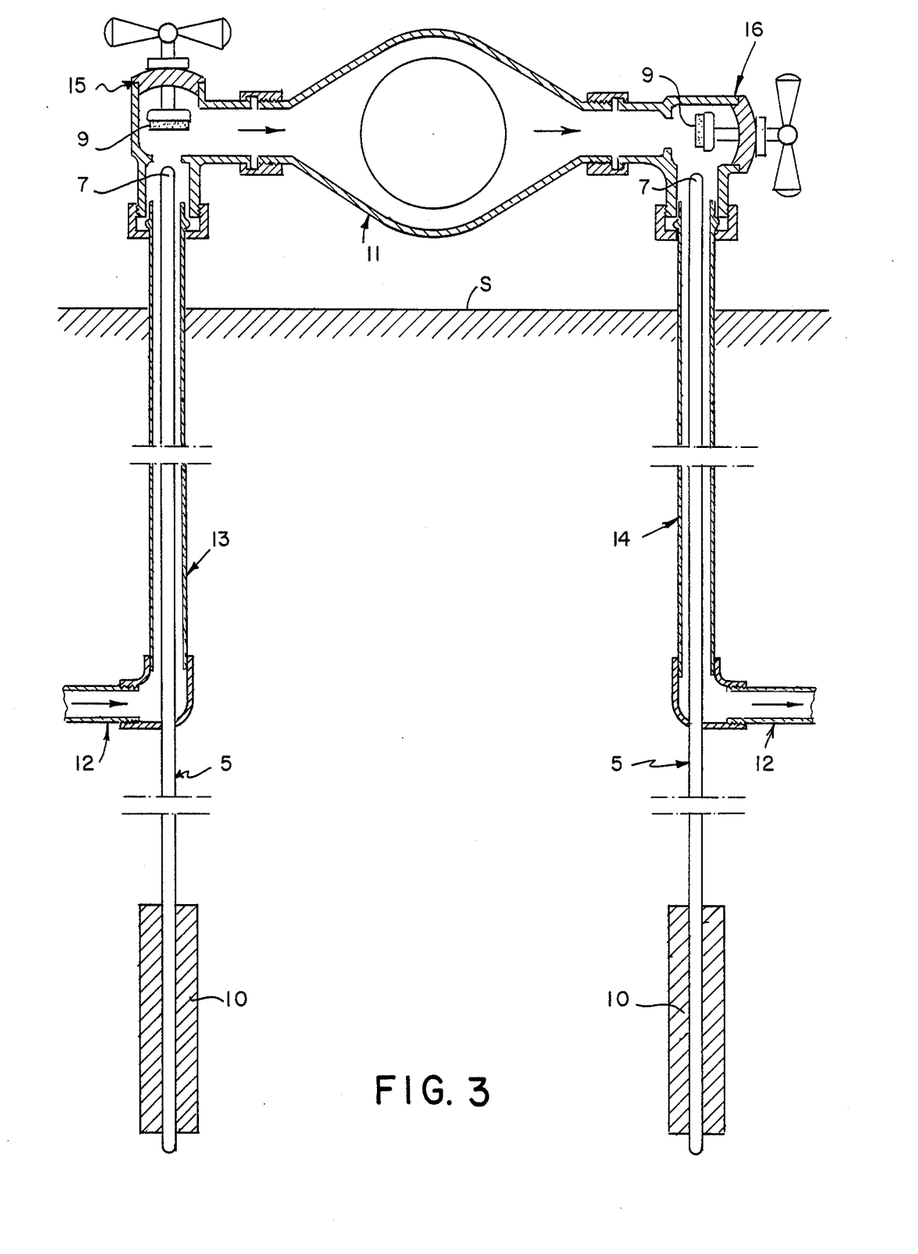
FIG. 3 is a plan view illustrating the application of the invention to a water meter.

FIG. 3 illustrates the application of the invention to a water meter represented by a metal enclosure 11 symbolizing the water chamber of the meter. This chamber 11 is placed into a water circulation comprising the underground water supply line 12, the flow of which is to be measured, a riser pipe 13 to bring water to the meter (aboveground), and a connecting pipe 14 to the underground line 12.

The water chamber 11 is connected upstream with the riser pipe 13 by means of a gate valve 15 and downstream with the descending pipe 14 by means of a second gate valve 16. The valves 15 and 16 serve to isolate the meter and to interrup the circulation of water in the lines 12.

The rising and descending pipes 13 and 14 are equipped each with a heat pipe system (5, 10), that is identical with that shown in FIG. 2.

The meter is placed advantageously in a plastic cabinet (not shown), containing an insulating material surrounding the meter.

The two anti-freezing valves 15 and 16 effectively protect the meter against freezing by virtue of the transfer of heat from soil zones where the collectors 10 are buried, to the valves 15 and 16 flanking the meter, thereby preventing the freezing of the water circulating from the valve 15 to the valve 16, even in the case of a substantially negative temperature of the adjacent atmosphere.

Figure 4:
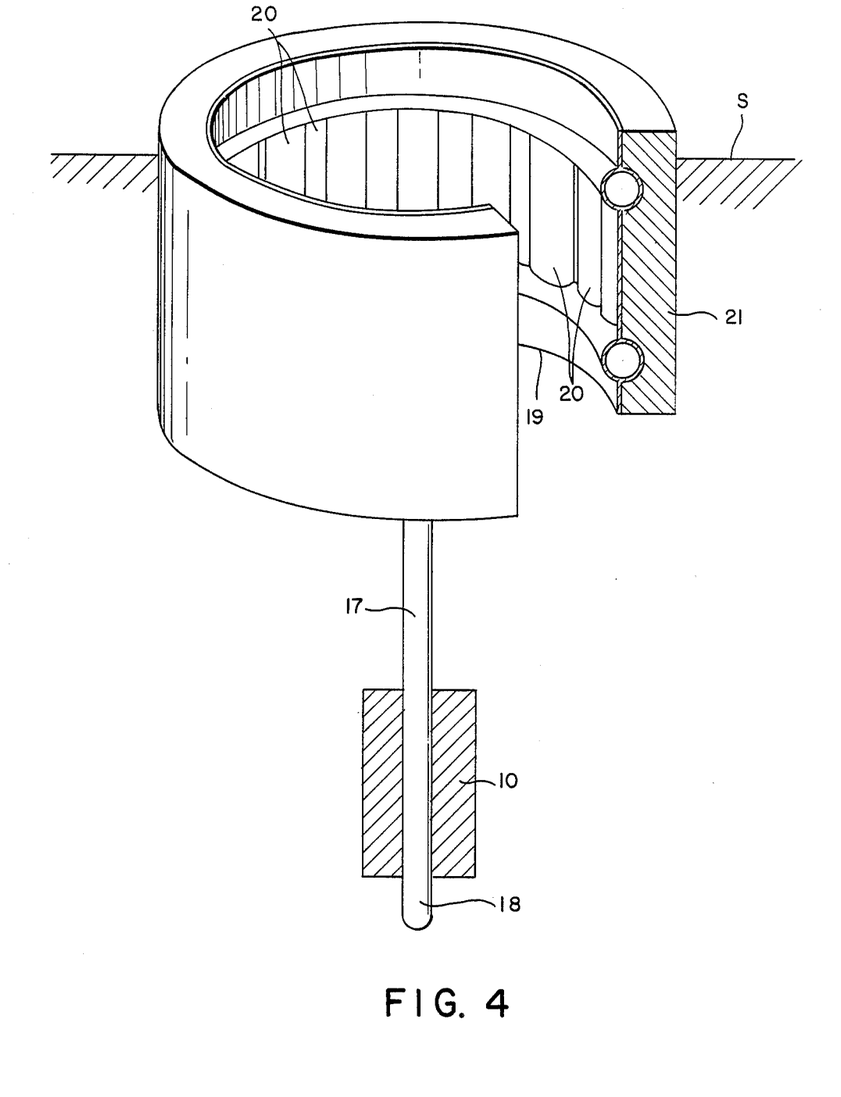
FIG. 4 is a perspective view, partly in section, illustrating the application of the invention to a manhole of a water installation.

FIG. 4 shows the application of the invention to the protection of a manhole or hydrant. For this purpose the heat pipe system 17 comprises a lower part 18 (or several such parts) with heat collecting fins 10, deeply embedded in the ground and connected with an upper part in the form of a sleeve 19 surrounding the manhole or hydrant (not shown) at the soil level S. In the embodiment of FIG. 4, the upper part 19 is realized according to the well known method of "roll bonding". For this purpose, the circulation of the fluid in the heat pipe is contained between two annular metal sheets, applied against each other and defining among them the branched conduits 20, which communicate with the rest of the heat pipe. Advantageously, the external face of the laminated sleeve 19 is surrounded by a thermal insulating layer 21.

It should be understood that in place of the branched layout 20, a continuous annular sleeve could be provided around the hydrant to be protected.

The circular opening at the upper part of the device is advantageously equipped with a cover.

Such a structure may be used for the protection of elements sensitive to the cold, but containing no water.

Figure 5:
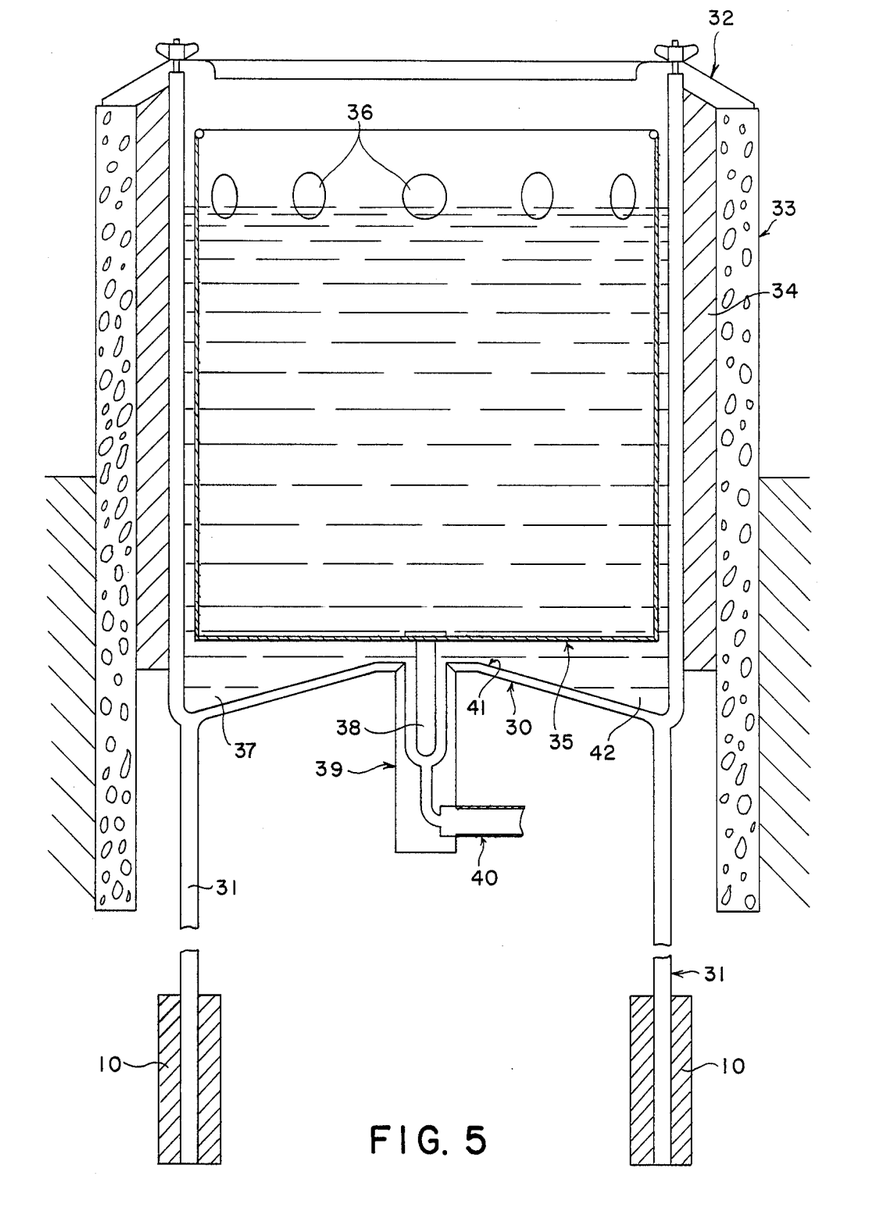
FIG. 5 is a schematic view along an axial vertical section of an automatic nonfreezing drinking bowl installed according to the invention.

FIG. 5 shows an application of the invention to the installation of an automatic drinking or watering bowl protected against freezing. For this purpose, the heat pipe system comprises an upper part in the form of cylindrical or polygonal double-walled trough, partitioned or not, connected to several parallel lower conduits 31 embedded in the ground and equipped with a plurality of heat collector fins 10.

The trough 30 is suspended at its upper part by a peripheral flange 32 from the upper border of a support structure 33, for example of masonry, surrounding the trough 30 and partially buried in the ground. The flange 32 also includes an inwardly projecting stop lip 32'. A thermal insulating material 34 is interposed between the trough 30 and the structure 33.

Inside the trough 30 there may be a cylindrical or polygonal bucket having a plurality of filling holes in its upper part.

The bucket 35 may float in the water contained in the trough 30 until it contacts the stop lip 31'. On the axis of the bucket and on the outside of it, an extension 38 forms a needle for engaging a valve body 39, the valve body 39 being attached to the bottom of the trough 30 and connected with a water inlet pipe 40.

When the level of the water 37 reaches the height of the holes 36 in the bucket 35, the latter is filled and then sinks with the needle 38 closing the water inlet in the body of the valve 39. The bowl is full. At the rate at which it is emptied, the lighter bucket rises at a certain moment and again permits the admission of water into the trough 30 through the gap between the needle 38 and the valve body 39.

The bottom of the trough 30 has an elevated bottom 41 to the right of the needle 38 so as to provide at the internal periphery a zone 42 for the collection of dirt or various debris, thereby preventing the clogging of the valve.

The operation of a drinking bowl of this type is thus completely automatic and its protection against freezing is permanently assured by means of the trough 30 formed by the upper part of the heat pipe.

In the device of FIG. 5 the floating bucket 35 and its needle 38 may be eliminated, the water inlet being controlled by an automatic or manual valve or the bowl being filled by other means.

Figure 6:
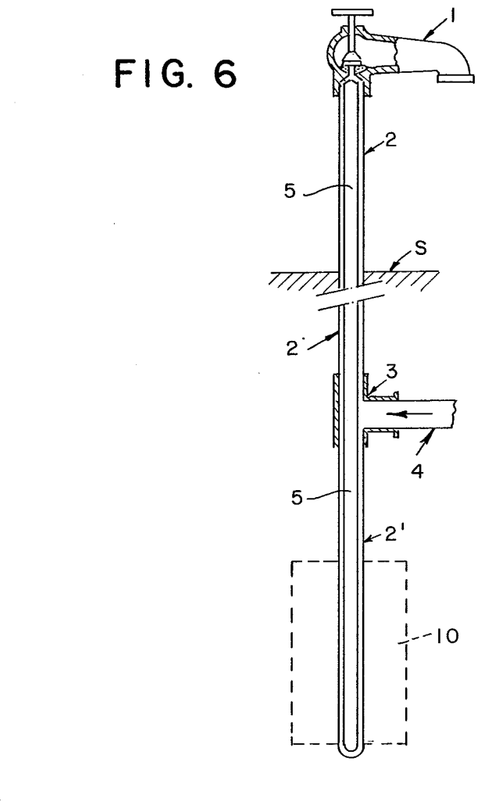
FIG. 6 is a schematic view similar to FIGS. 1 and 2 of an alternate embodiment.

FIG. 6 illustrates a variant of the embodiment of FIG. 1 and 2, according to which the riser pipe 2 extends downward past the Tee connection 3 by a tubular sleeve 2', the length of which corresponds to the depth of the embedding of the lower end of the heat pipe 5. The latter is completely inserted in the tubular conduit 2, 2', ending in a blind hole. Such an installation permits the instantaneous removal of the heat pipe 5 in case of failure and its immediate replacement.

One or several heat recovery fins may be attached externally to the sleeve 2' at its lower end, to assure good heat transfer in spite of the soil surrounding the lower part of the heat pipe 5 through the conduit 2' and the water surrounding the said heat pipe.

Figure 7:
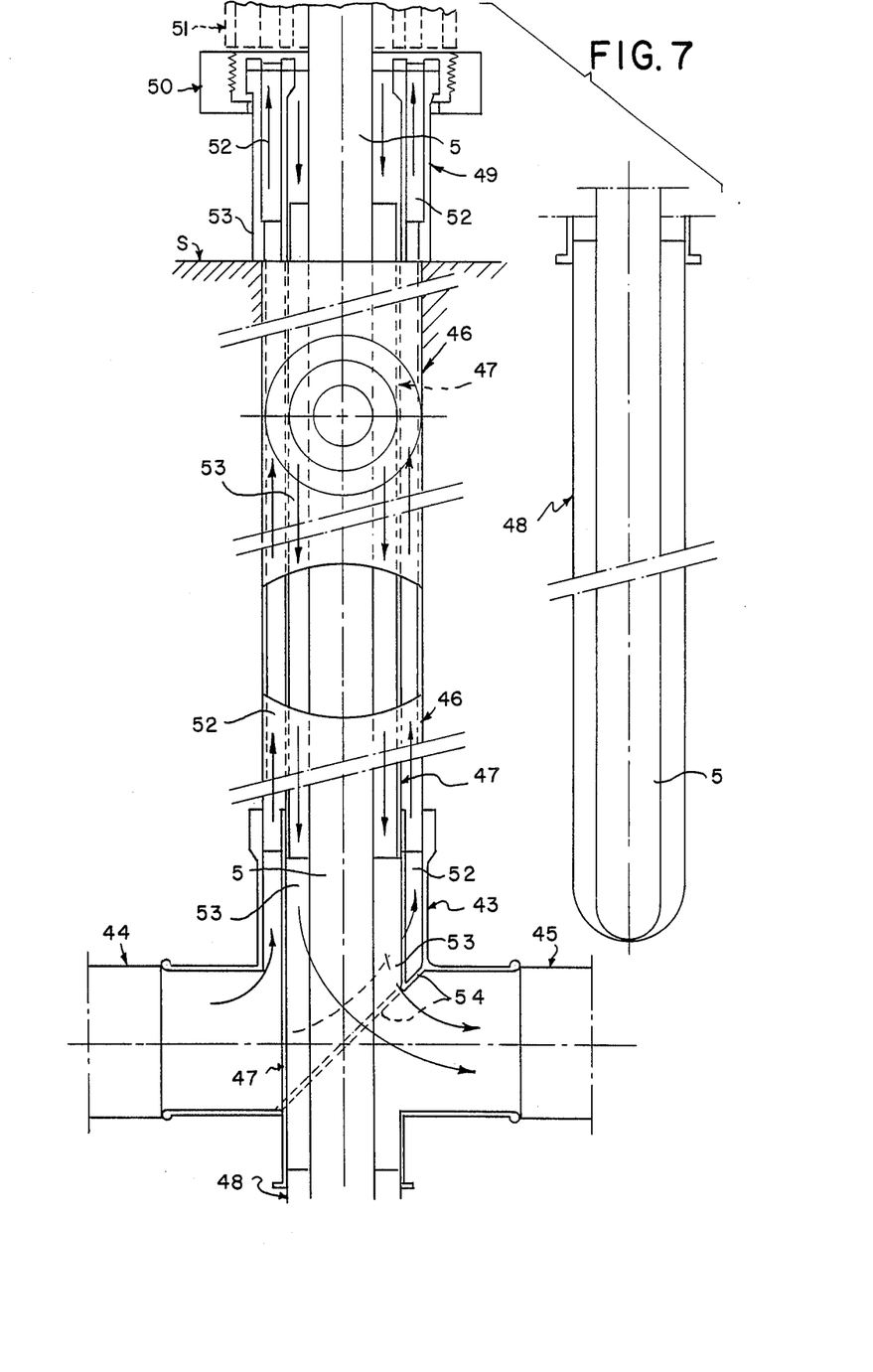
FIG. 7 is a view along an axial vertical section of a further device according to the invention applied to a water meter.

In the mode of embodiment of FIG. 7, a special Tee connection 43 is provided, interposed between the line 44 of the water supply system and the line 45 and the service outlet line 45 of a user.

The connection 43 is joined to a riser pipe 46, wherein a coaxial riser pipe 47 is arranged, extending under the connection 43 by means of a cylindrical sleeve into a blind hole (48), identical with the tubular sleeve 2' of FIG. 6 and optionally being equipped on the outside with thermal fins (not shown).

The bridges are provided between the coaxial conduits 46 and 47 to assure the necessary spacing between the lines.

The upper ends of the lines 46 and 47 rise above the level of the soil S and are joined with a connection 49 equipped with a union nut 50 to connect with a water meter 51, exposed to the atmosphere in an extension of the lines 46, 47.

The conduits 46, 47 are laid out in a manner so that the water coming from the water system pipe 44 rises in the direction of the meter 51 in the annular intermediate piece 52 between the lines 46 and 47 and descends, after passing through the meter, in the direction of the line 45, through an annular conduit 53 defined between the conduit 47 and a heat pipe placed inside the conduit 47 and its lower extension 48, the direction of circulation being indicated by the arrows in FIG. 7. An arched deflecting segment 54 is interposed between the lines 46 and 47 to the right of the connection 43, to permit the circulation of the water.

The upper end of the heat pipe 5 penetrates at least partially into the water chamber of the meter 51, except that the lower end extends to the sleeve 48, i.e. to the distance required below the soil level. If necessary, the heat pipe 5 may be removed instantaneously and replaced by a new heat pipe.

Figure 8:
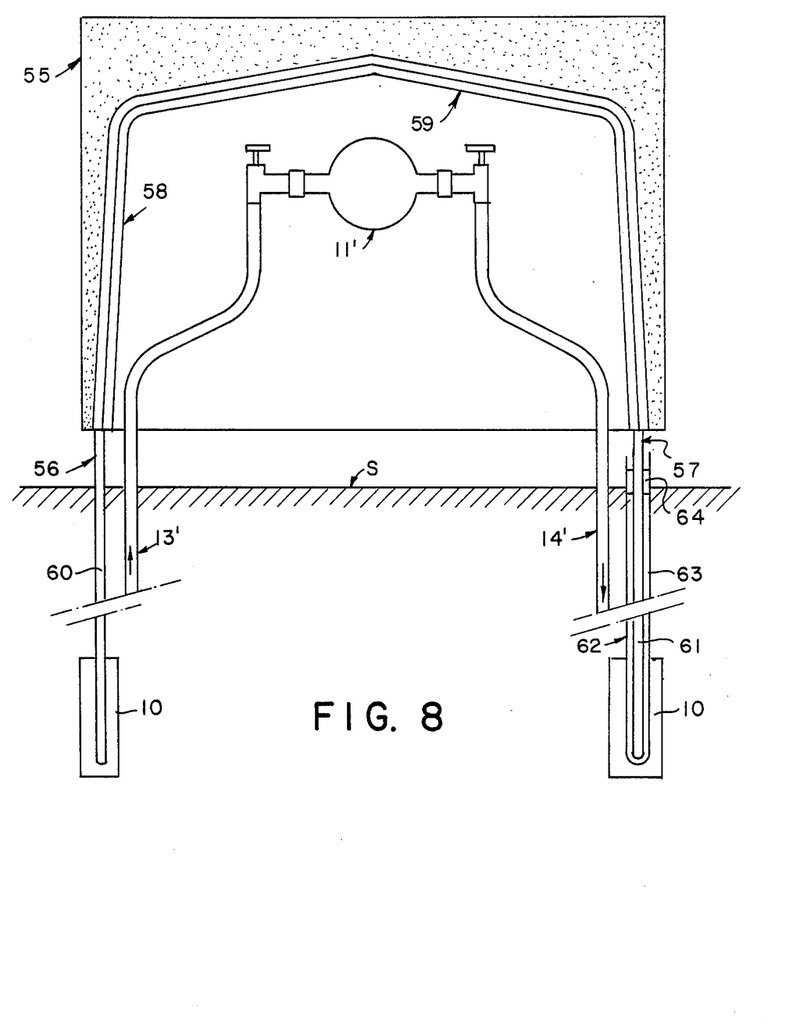
FIGS. 8 and 9 are schematic views of two further embodiments as applied to water meters.

FIG. 8 illustrates a variant of the embodiment of FIG. 3, according to which the water meter 11' is no longer protected by heat pipes inserted in the riser pipe 13' and the descending pipe 14', but by heat pipes surrounding the part of the assembly under the soil S.

For this purpose, a parallelepipedic box 55 is provided, lined with a thermal insulating material, closed and insulated at its lower part and covering the elements 11', 13' and 14' above ground. One of the vertical sides of the box 55 is provided with an access door (not shown). To the inner face of the box 55, two heat pipes 56 and 57 are attached by any appropriate means, opposite the pipes 13' and 14' and the meter 11'.

Each heat pipe comprises a part 58 and 59 in the form of a square applied against the box 55 and extended on the outside in the direction of the ground by a tubular conduit 60, 61.

The parts 58 and 59 of the heat pipes are produced by the so-called "roll bonding" method and are flat, rectangular elements for example with a width of fifteen centimeters and bent to adapt to the box 55, the assembly having a structure similar to that of the device of FIG. 4. The lower end of the pipe 60 may be equipped with a thermal fin 10.

The left side of FIG. 8 illustrates a first mode of (direct) embedding of the pipe 60 in the ground at the time of the installation of the box 55.

The right hand side of FIG. 8 illustrates a second mode of the installation of the pipe 61. The latter is encased in a sort of metal tube section 62 buried vertically and optionally equipped with a thermal fin 10. The pipe 62 is filled with water 63 with a small amount of oil 64 at the surface to prevent the evaporation of the water. With this layout, the installation and removal of the box 55 with the heat pipes is particularly rapid and easy.

Figure 9:
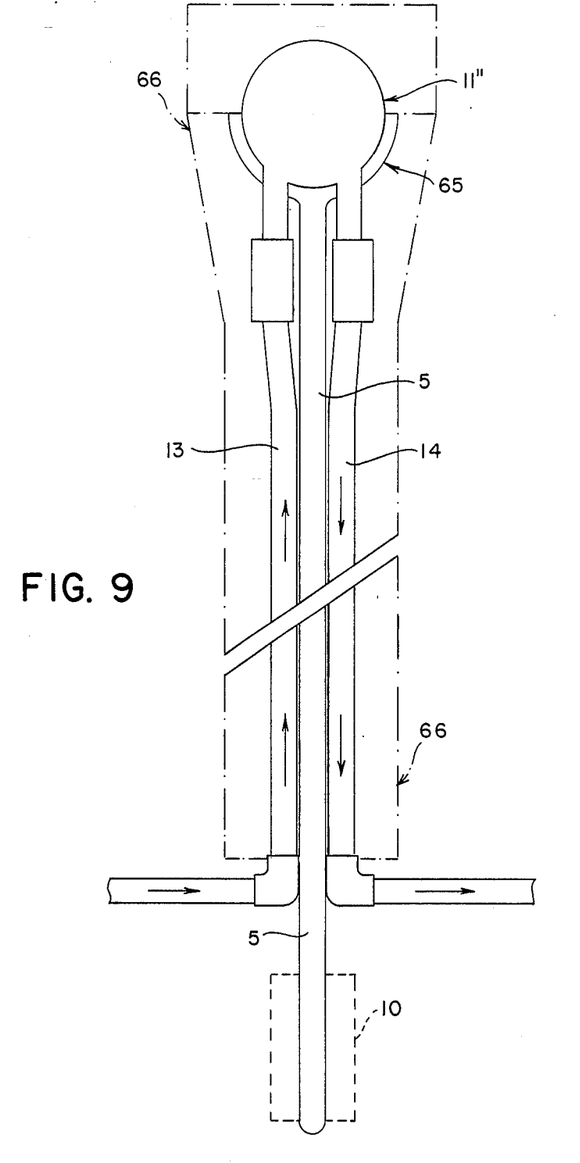

FIG. 9 again illustrates another application of the invention to the protection of a meter (11') and its accessories. For the purpose, a system of heat pipes (5) is inserted between the two inlet lines (13) and the outlet (14) of the water and carry, on the upper part, at least one solid heat diffusor fin, or, more advantageously, a double walled cradle (65) made by the "roll bonding" method and laid out so that it is located in the immediate vicinity of the object to be protected (11"). The assembly is covered with thermal insulation (66) over its part exposed to the cold, the lower part of the heat pipe system either being equipped with a fin (10), or installed in a tubular tube well similar to the tube well (48) of FIG. 7.

It should be understood that the invention is not limited to the modes of embodiment shown and described above, but to the contrary covers all variants, in particular those concerning the forms and arrangements of the heat pipe systems as a function of the various applications considered, especially with respect to the nature of the water storage and supply installations to be protected. The invention equally applies to freezable liquids and in a general manner to all elements sensitive to the cold. The section of the heat pipe or pipes is not necessarily constant over the length of the system.

Furthermore, the parts (58, 59) of the heat pipes made by the "roll bonding" method may be replaced by a branched or straight fin structure, such as that of the lower part of the heat pipe (56).

What is claimed:

1. A device for protection of a liquids installation susceptible to freezing comprising two heat pipes each having a lower part underground at a depth sufficient to insure a temperature always above 0° C., said lower part having a fin type heat recovery system and each said heat pipe having an internal system for distribution of condensate drip, and an upper part of each said heat pipe being located in the immediate vicinity of a part of a liquids installation exposed to a danger of freezing and joined to an inside face of a stationary cabinet of a thermal insulating material covering said liquids installation.

2. A device according to claim 1, wherein the lower part of each heat pipe engages an underground vertical conduit filled with water covered with oil.

3. A device according to claim 1, wherein said stationary cabinet is upwardly closed and laterally surrounds and covers said liquids installation; and wherein said liquids installation is a fluid or water meter.

* * * * *